(12) United States Patent
Keenum et al.

(10) Patent No.: US 6,904,149 B2
(45) Date of Patent: Jun. 7, 2005

(54) TOOL-LESS WALL-MOUNT DISTRIBUTED FILTER HOUSING

(75) Inventors: John A. Keenum, Keller, TX (US); Brett A. Menke, Ft. Worth, TX (US); Harley J. Staber, Coppell, TX (US)

(73) Assignee: Corning Cable Systems LLC, Hickory, NC (US)

( * ) Notice: Subject to any disclaimer, the term of this patent is extended or adjusted under 35 U.S.C. 154(b) by 405 days.

(21) Appl. No.: 09/928,318

(22) Filed: Aug. 13, 2001

(65) Prior Publication Data

US 2002/0044646 A1 Apr. 18, 2002

Related U.S. Application Data

(63) Continuation-in-part of application No. 29/127,805, filed on Aug. 11, 2000.
(60) Provisional application No. 60/224,705, filed on Aug. 11, 2000.

(51) Int. Cl.[7] ................................................ H04M 1/00
(52) U.S. Cl. ...................................... 379/445; 379/438
(58) Field of Search .............................. 379/445, 435, 379/447, 438; 439/536

(56) References Cited

U.S. PATENT DOCUMENTS

| 4,588,866 A | * | 5/1986 | Monti ......................... 379/435 |
| 6,137,866 A | | 10/2000 | Staber et al. ............ 379/93.06 |
| 6,186,826 B1 | * | 2/2001 | Weikle ........................ 439/536 |

OTHER PUBLICATIONS

Corning Cable Systems Product Information, ADSL Tool-less Wall-Mount Distributed Micro-Filter, May 2001.
Corning Cable Systems Product Information, ADSL Tool-less Wall Mount Distributed Micro-Filter, Oct. 2000.
Corning Cable Systems Product Information, Toolless Wall-mount Distributed Microfilter, Jul. 2001.
Excelsus Technologies, Inc. Product Information, Z-BLOCKER™ Z-200CW Wall Phone Filter, Jul. 7, 2000.

* cited by examiner

Primary Examiner—Jack Chiang
(74) Attorney, Agent, or Firm—Christopher C. Dremann

(57) ABSTRACT

A housing for a distributed filter removably mounts to a wall plate between the wall plate and a wall-mount telephone without the use of a tool. The housing includes a base and a cover attached to the base that together define a cavity. A filter circuit for filtering voice signals is disposed within the cavity. A phone jack and at least one auxiliary jack are also disposed in the cavity and accessible through the cover. In one embodiment, viewing windows are formed through the cover to permit an installer to view the mounting studs on the wall plate during installation. A slide lock is also provided to secure the housing to the wall plate. In another embodiment, a push-button lock is provided to secure the housing to the wall plate. The push-button is forced outwardly during installation when a mounting stud engages a slot formed in the base and is subsequently depressed to secure the housing to the wall plate.

23 Claims, 8 Drawing Sheets

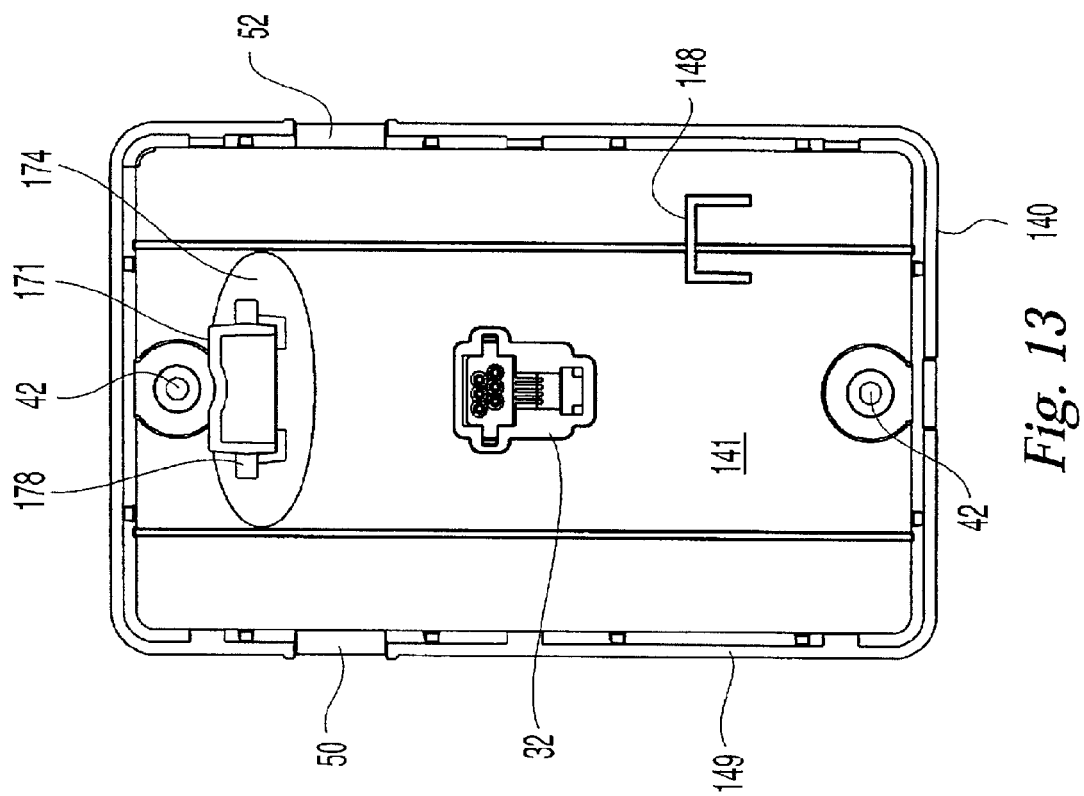
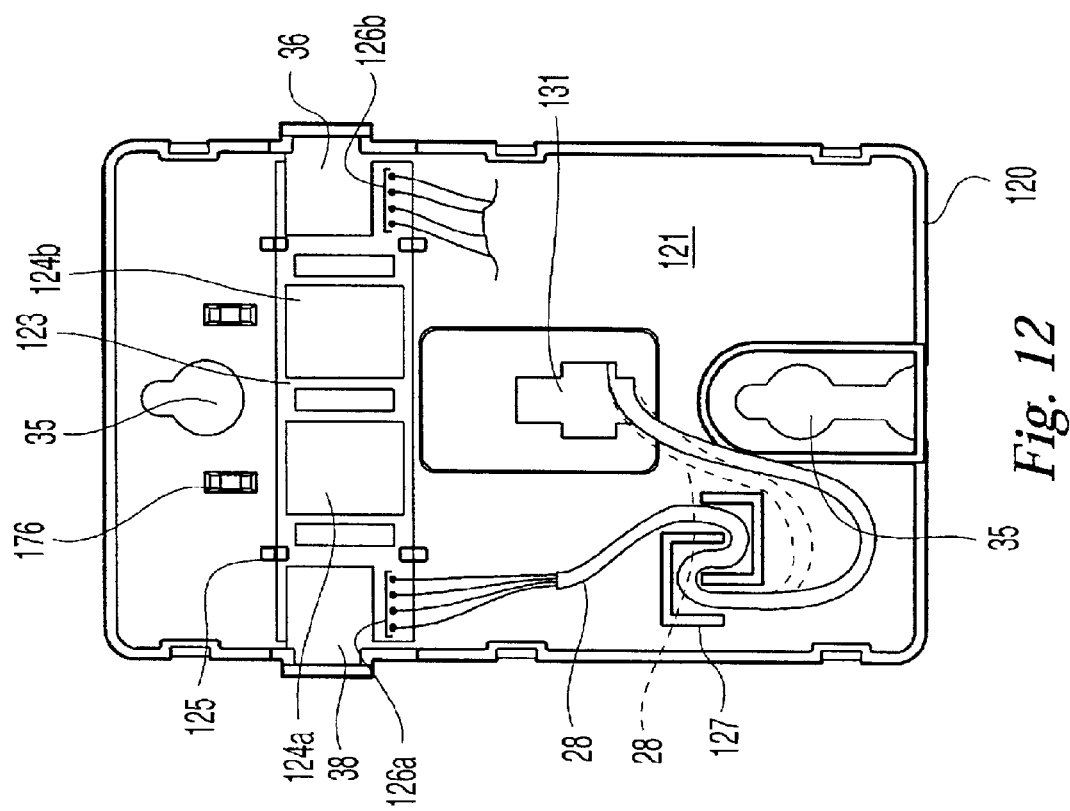

TOOL-LESS WALL-MOUNT DISTRIBUTED FILTER HOUSING

CROSS REFERENCE TO RELATED APPLICATIONS

This application is a continuation-in-part of U.S. Design application Ser. No. 29/127,805, filed Aug. 11, 2000. This application claims the benefit of U.S. Provisional Application No. 60/224,705, filed Aug. 11, 2000.

FIELD OF THE INVENTION

The invention relates generally to a wall-mount housing for use at subscriber premises. More particularly, the invention is a wall-mount housing for a distributed filter to separate voice and data signals at a subscriber premises that does not require tools for installation.

BACKGROUND OF THE INVENTION

High speed Internet access is becoming increasingly commonplace in commercial and residential telecommunications installations. One technology being used for high speed Internet access is commonly known as splitter-less asymmetrical digital subscriber line ("Splitter-Less ADSL") or "G.Lite." However, several other forms of digital subscriber line ("DSL") services exist, collectively referred to as "xDSL," that may be able to utilize a housing constructed in accordance with the invention. Splitter-Less ADSL utilizes a low pass filter electrically insulated and physically protected within a housing. The present practice is to house the low pass filter within an indoor xDSL splitter assembly of the type disclosed in U.S. Pat. No. 6,137,866 issued Oct. 24, 2000 to Staber et al., which is assigned to the assignee of the present invention. Indoor xDSL splitter assemblies, however, typically require the use of a tool, such as a screwdriver, to install the assembly on a wall, ceiling or floor at subscriber premises. The use of a screwdriver to install the assembly is generally considered to be "non-subscriber-friendly," and thus, generally requires that a craftsperson be dispatched from the service provider, resulting in service delays and substantial expense.

Although an ADSL filter product that does not require a tool to install is available from EXCELSUS™ Technologies, Inc. of Carlsbad, Calif., under the trade name Z-BLOCKER™, that product does not provide the installer with adequate viewing of the alignment of the housing during the installation process. The housing of the Z-BLOCKER™ filter mounts to the mounting studs of a wall plate between the wall plate and a conventional wall-mount telephone. The housing is provided with elongated slots formed in the rear surface that receive the mounting studs of the wall plate to removably attach the housing to the wall plate. Enlarged portions of the slots are positioned over the mounting studs and the housing is moved downwardly until the mounting studs are securely retained within the slots. The alignment of the enlarged portions of the slots with the mounting studs, however, is not readily visible during the installation of the housing on the wall plate. Accordingly, it is possible that the housing will not be securely retained on the mounting studs and will detach from the wall plate when the telephone is mounted on the housing, thereby possibly damaging the filter and/or electrical connections within the housing or the telephone if the housing and the telephone fall from the wall plate onto a hard surface. In addition, the Z-BLOCKER™ filter includes a phone plug that is rigidly fixed to the rear surface of the housing, and thus, cannot accommodate a recessed or flush-mounted type wall jack.

In view of the noted deficiencies in the prior art, it is apparent that a need exists for a wall-mount housing for a high-speed Internet access product that is subscriber friendly. A more particular need exists for a wall-mount housing for a distributed filter to separate voice and data signals at a subscriber premises that does not require a tool to install the housing on a wall plate. It is further apparent that such a wall-mount housing is needed that provides the installer or subscriber with adequate viewing of the alignment of the housing during the installation process.

SUMMARY OF THE INVENTION

The above objectives and advantages, as well as others, are realized and attained by the wall-mount housing of the present invention. Additional features and advantages of the invention will be set forth in the written description that follows, as well as the accompanying drawings, or will be readily apparent from the description, or may be learned by practice of the invention.

In a particular embodiment, the present invention is a wall-mount housing for a distributed filter that is removably attached to a wall plate without the use of a tool. The housing is mounted to a wall plate having at least one mounting stud protruding outwardly therefrom. The housing includes a base having a slot formed therein for receiving the mounting stud of the wall plate to removably mount the housing to the wall plate. The housing also includes a cover overlying the base and attached thereto so that the cover and the base define a cavity therebetween. The housing further includes a filter circuit disposed within the cavity and a phone jack disposed within the cavity that is accessible through the cover. At least one auxiliary jack is also disposed within the cavity and accessible through the cover. The housing further includes a line cord with at least one wire pair electrically connected to the phone jack and the auxiliary jack.

Preferably, the cover has at least one mounting stud protruding outwardly therefrom for removably mounting a wall-mount telephone to the housing. The at least one auxiliary jack preferably includes a secondary phone jack and a DSL jack. The filter circuit delivers a filtered voice signal to at least one of the phone jack, the secondary phone jack and the DSL jack. The line cord has a phone plug attached at one end and a portion of the line cord and the phone plug extend outwardly through an opening formed in the base of the housing. The phone plug is electrically connected to a phone jack on the wall plate and the phone jack of the housing is electrically connected to the wall-mount telephone. The filter circuit may be disposed on a printed circuit board and the line cord may be electrically connected directly to the printed circuit board. Alternatively, the housing may further include a plurality of wire terminating devices selected from the group consisting of screw terminals, insulation displacement contacts (IDCs") and solder points for electrically connecting the line cord, the filter circuit, the phone jack and the at least one auxiliary jack.

The housing may also include at least one viewing window for viewing the mounting stud of the wall plate while the housing is mounted to the wall plate. In a particular embodiment, the at least one mounting stud of the wall plate includes an upper mounting stud and a lower mounting stud. The at least one viewing window of the cover includes an upper window for viewing the upper mounting stud of the wall plate and a lower window for viewing the lower mounting stud of the wall plate. Furthermore, the slot of the base includes an upper slot and a lower slot for receiving the upper mounting stud and the lower mounting stud, respectively, of the wall plate. The line cord is provided with at least one wire pair, but is preferably provided with two wire pairs so that the housing may be configured for a first telephone line and a second telephone line. In a particular embodiment, the filter circuit delivers a filtered voice signal to at least one of the first telephone line and the second telephone line. In another particular embodiment, the filter circuit delivers a filtered voice signal to both the first telephone line and the second telephone line.

The housing may also include a locking mechanism disposed within the cavity that is movable between an unlocked position and a locked position to secure the housing to the wall plate without the use of a tool. In a particular embodiment, the locking means includes a slide lock having a grip portion adjacent one end and a stop portion adjacent the other end. The stop portion does not obstruct the slot of the base in the unlocked position, but does obstruct the slot of the base in the locked position. The grip portion extends outwardly from the housing in the unlocked position and is substantially flush with the housing in the locked position. The slide lock has a recess formed therein. The locking mechanism further includes a pair of opposed guide ribs extending inwardly from one of the base and the cover for guiding the stop portion, and a retaining rib extending inwardly from the other of the base and the cover into the recess to retain the stop portion between the guide ribs. In another particular embodiment, the locking mechanism includes a push-button lock having an actuating portion adjacent one end and a stop portion adjacent the other end. The stop portion does not obstruct the slot of the base in the unlocked position, but does obstruct the slot of the base in the locked position. The actuating portion extends outwardly from the housing in the unlocked position and is substantially flush with the housing in the locked position. The locking mechanism further includes a pair of opposed retaining clips extending inwardly from the base, and the stop portion has a pair of opposed retaining posts for engaging the retaining clips to retain the stop portion in the locked position.

BRIEF DESCRIPTION OF THE DRAWINGS

The accompanying drawings are included to provide a further understanding of the invention and are incorporated in and constitute a part of this specification, illustrate various embodiments of the invention, and, together with the description, serve to explain the principles and objectives of the invention. More specifically:

FIG. 12 is a plan view showing the inner surface of the base of the housing of FIG. 8;

FIG. 13 is a plan view showing the inner surface of the cover of the housing of FIG. 8.

DETAILED DESCRIPTION OF THE INVENTION

Figure 1:
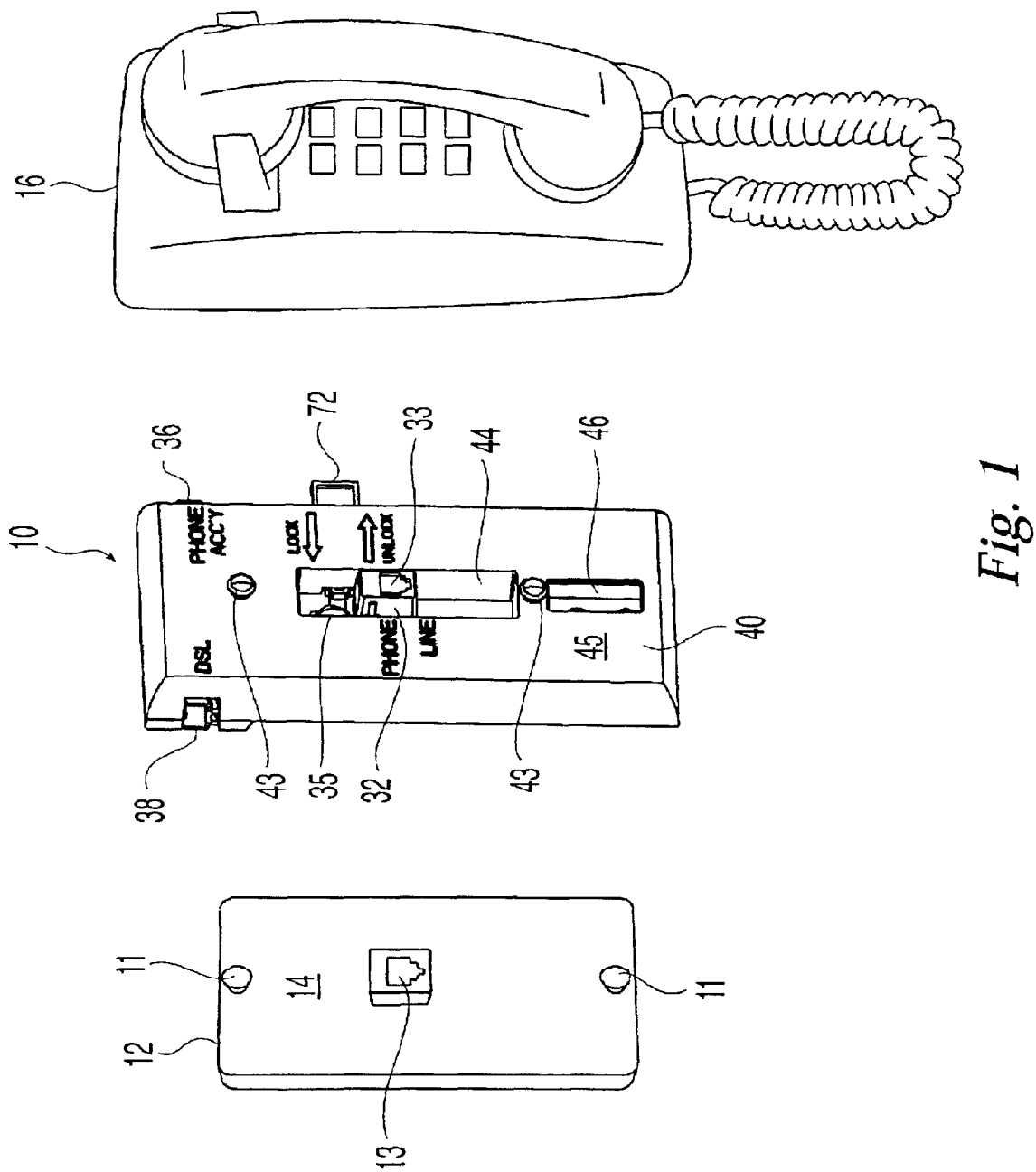
FIG. 1 is an exploded perspective view illustrating a housing according to the invention removably mounted between a wall plate and a wall-mount telephone.
Figure 2:
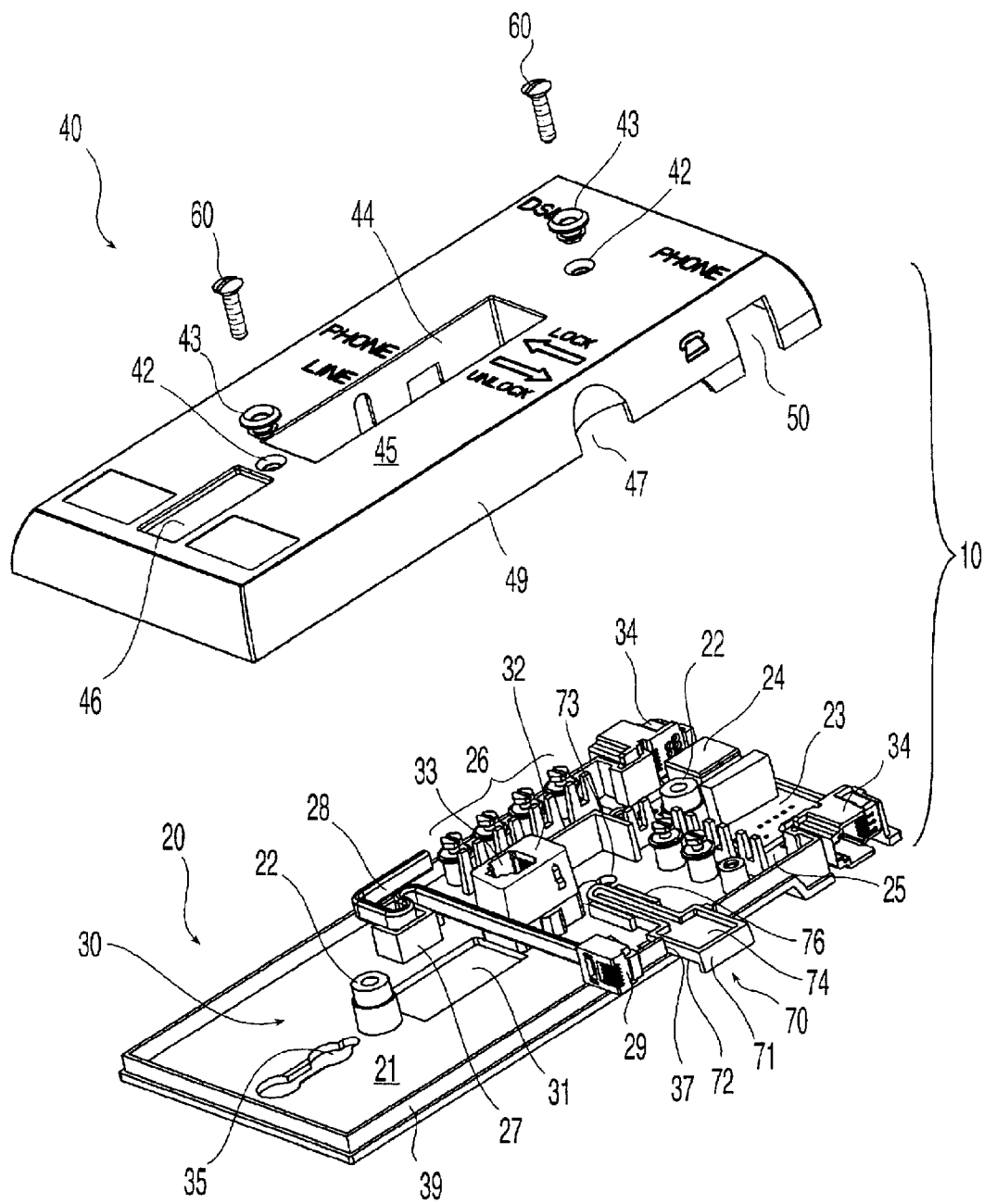
FIG. 2 is an exploded perspective view of the housing of FIG. 1.
Figure 5:
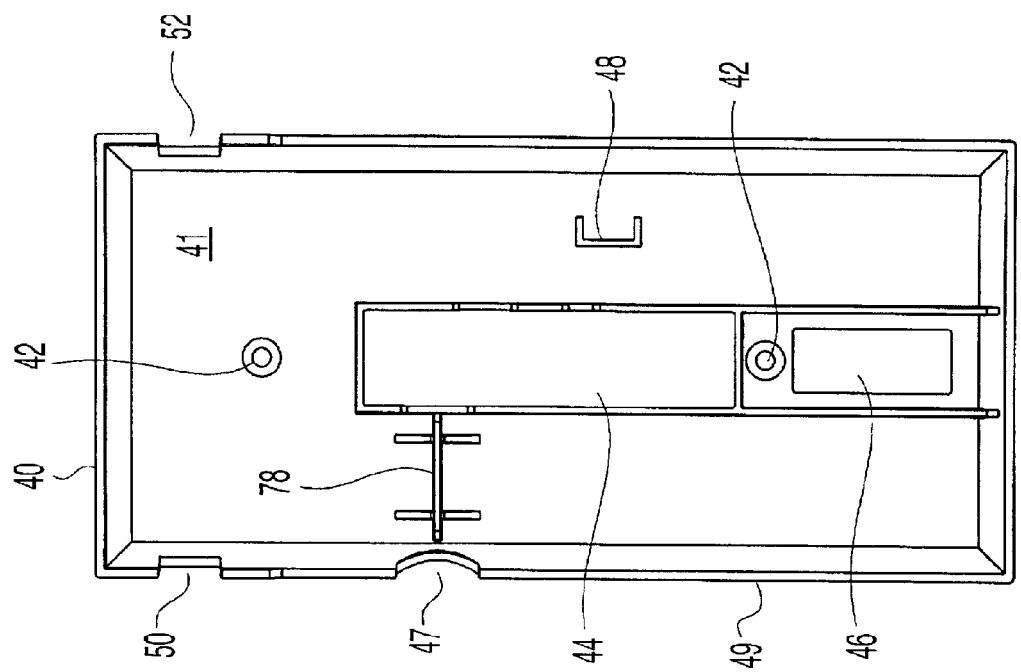
FIG. 5 is a plan view showing the inner surface of the cover of the housing of FIG.1.
Figure 4:
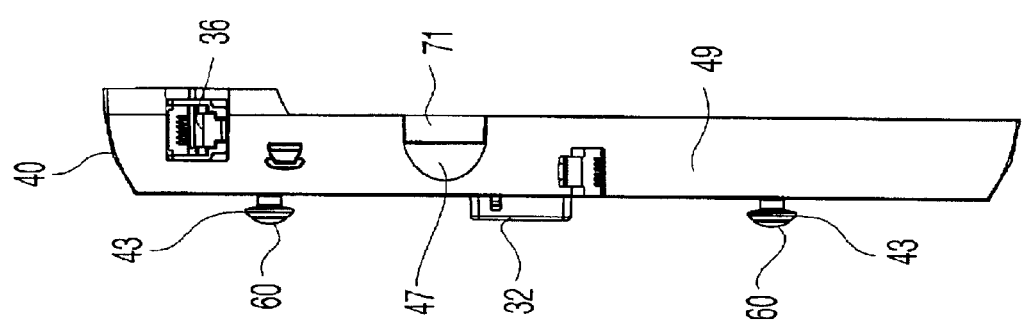
FIG. 4 is an elevation view showing the side of the housing of FIG. 1.
Figure 3:
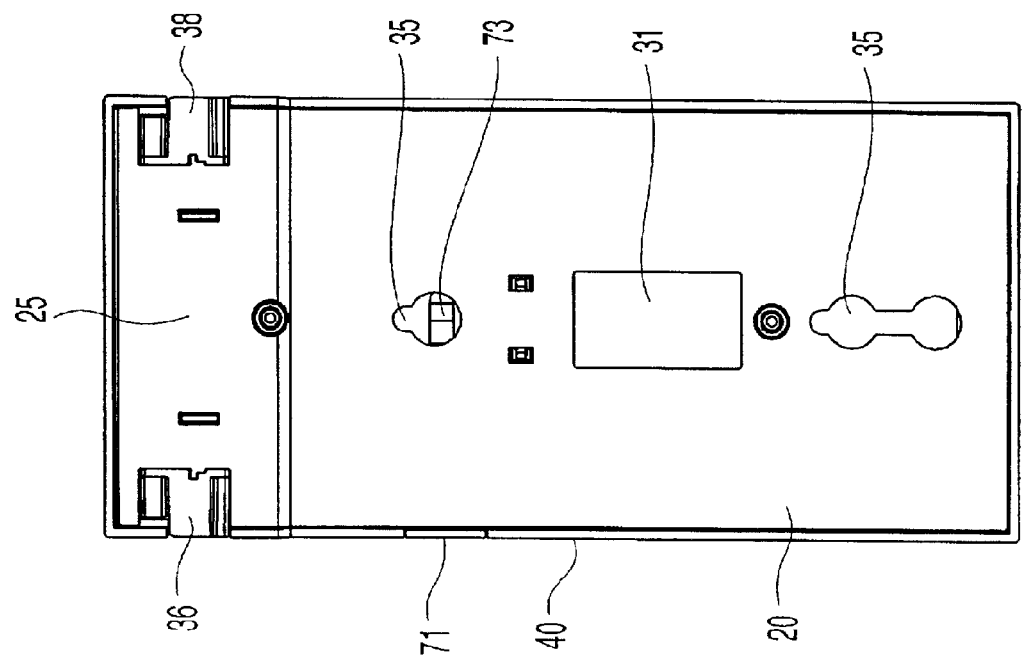
FIG. 3 is a plan view showing the rear of the housing of FIG. 1.

One or more embodiments of the invention will be described hereinafter in sufficient detail to permit one of ordinary skill in the art to make, use and practice the invention without undue experimentation. The embodiments shown and described herein are exemplary only and are not intended to limit the scope of the invention, as defined by the appended claims, in any manner. Instead, the invention is intended to be construed broadly with reference to this detailed description and the accompanying drawings, in which like reference numerals indicate like parts in the various views.

FIG. 1 illustrates a housing 10 for a distributed filter constructed in accordance with the present invention removably mounted to a wall plate 12 between the wall plate 12 and a conventional wall-mount telephone 16. The wall plate 12 comprises a pair of mounting studs 11 and a phone jack 13 centrally disposed on the wall plate 12 between the mounting studs 11. The phone jack 13 is commonly referred to as a six position jack and may, for example, be a standard RJ-11 or RJ-14 style phone jack having a recess with at least a pair of contact wires disposed within the recess for transmitting voice and/or data communications. The wall plate 12 is commonly referred to as station apparatus. The telephone 16 comprises a complimentary RJ-11 or RJ-14 phone plug (not shown) with at least a pair of contact wires disposed thereon for engaging the phone jack 13. As shown herein, the phone jack 13 protrudes outwardly from the front surface 14 of the wall plate 12 so that the phone jack 13 may receive either a phone plug disposed on the rear surface of the telephone 16 or a line cord (not shown) having a phone plug attached thereto that extends outwardly from the telephone 16. Accordingly, the telephone 16 may also be a conventional desk type phone located remotely from the wall plate 12. However, as will be understood and appreciated by those of ordinary skill in the art, the phone jack 13 may instead be recessed or flush-mounted with the front surface 14 of the wall plate 12, in which case a telephone with a line cord is typically required.

The housing 10 is shown in greater detail in FIGS. 2–7. As shown and described herein, the housing 10 comprises a base 20 and a cover 40 attached to the base 20 such that the base 20 and the cover 40 define an internal cavity 30 therebetween. The base 20 and the cover 40 may be made of any suitable material, such as plastic or metal, and may be made of dissimilar materials. Preferably, however, the base 20 and the cover 40 are each made of a molded plastic material having sufficient strength and rigidity. The base 20 has a pair of internally threaded posts 22 and the cover 40 has a corresponding pair of holes 42 formed therethrough that receive externally threaded fasteners 60 to secure the cover 40 to the base 20. However, the cover 40 may be secured to the base 20 in any suitable manner. The cover 40 may even be permanently secured to the base 20, such as by ultrasonic welding, once the internal components are assembled and the necessary wiring terminations are made within the cavity 30 since the internal components and wiring terminations are not intended to be accessed by the subscriber. Preferably, however, the cover 40 is removably attached to the base 20 with the fasteners 60 so that a craftsperson dispatched from the service provider can access the cavity 30 to make any necessary repairs to the internal components and wiring terminations.

The housing 10 further comprises a filter circuit 24 (FIG. 2) mounted on the inner surface 21 of the base 20 such that the filter circuit 24 is electrically insulated and physically protected within the cavity 30 of the housing 10. The filter circuit 24 may be any electronic circuit for separating voice and data signals. In the embodiments shown and described herein, the filter circuit 24 is a low pass (i.e., distributed) filter for passing only the voice signal of an asymmetrical digital subscriber line ("ADSL"). The filter circuit 24 is mounted on a printed circuit board 23 having at least a pair of input wire terminations and at least a pair of output wire terminations disposed thereon that are electrically connected to the filter circuit 24. Preferably, the printed circuit board 23 is positioned on a recessed shelf 25 formed on the inner surface 21 of the base 20. The shelf 25 is recessed relative to the inner surface 21 to provide additional space within the cavity 30 for the filter circuit 24, while at the same time maintaining a relatively thin profile for the housing 10 when mounted on the wall plate 12. The shelf 25 is positioned above the wall plate 12 when the housing 10 is attached to the mounting studs 11 so that the thickness of the shelf 25 does not cause the telephone 16 to extend outwardly from the wall plate 12 an undesirable distance. A plurality of wire terminating devices 26 are also provided on the inner surface 21 of the base 20. As shown, wire terminating devices 26 are conventional screw terminals. However wire terminating devices 26 may be any suitable devices for establishing electrical continuity, such as insulation displacement contacts ("IDCs"), or may simply be solder points disposed on the inner surface 21 of the base 20. Alternatively, the electrical connections may be made by soldering the ends of the wires directly to the wiring terminations provided on the printed circuit board 23, or the printed circuit board 23 may be provided with wiring terminals.

A line cord 28 (FIG. 2) having a phone plug 29 attached at one end is routed through an S-shaped strain relief guide 27 affixed to the inner surface 21 of the base 20. A generally U-shaped retaining rib 48 (FIG. 5) extends downwardly from the inner surface 41 of the cover 40 to retain the line cord 28 within the strain relief guide 27 when the cover 40 is secured on the base 20. A portion of the line cord 28 and the phone plug 29 extend through an opening 31 formed through the base 20 to engage the phone jack 13 of the wall plate 12. The line cord 28 and phone plug 29 may be replaced by an inextensible phone plug that protrudes outwardly from the base 20. However, the use of the extensible line cord 28 and phone plug 29 permits the housing 10 to be utilized with both a wall plate 12 having a protruding phone jack 13 (as shown) and a wall plate having a recessed or flush-mounted phone jack. The opening 31 is preferably sized appropriately to permit any excess length of the line cord 28 to be coiled and easily stored adjacent the opening 31 and a first opening 44 formed through the cover 40. As previously described, phone jack 13 may be an RJ-11 or RJ-14 style jack depending on whether the housing 10 is configured to service a single telephone line or two telephone lines, respectively. The phone plug 29 is a six position plug that is wired as necessary to complement the phone jack 13. For example, the phone plug 29 is wired with only a single pair of tip and ring wires in positions 3 and 4 if the phone jack 13 is an RJ-11 style jack and is wired with a second pair of tip and ring wires in positions 2 and 5 if the phone jack 13 is an RJ-14 style jack.

The housing 10 further comprises a phone jack 32 and at least one auxiliary jack 34, as will be described. The phone jack 32 is identical to the phone jack 13 of the wall plate 12 and protrudes upwardly from the inner surface 21 of the base 20 through the first opening 44 formed through the cover 40. Accordingly, the phone jack 32 has a recess 33 with at least a pair of contact wires disposed within the recess for transmitting plain old telephone service ("POTS") voice signals. The phone jack 32 receives the phone plug of the telephone 16 in the same manner as the phone jack 13 receives the phone plug 29 of the line cord 28 of the housing 10, as previously described. The auxiliary jack 34 may be an additional phone jack for a second telephone line, or may be an additional phone jack for other telecommunications equipment, such as a facsimile machine or answering machine, on the same line as the telephone 16. The auxiliary jack 34 may also be a data jack for data communications, such as high speed Internet access. As shown and described herein, the housing 10 comprises both a pair of auxiliary jacks 34, namely a secondary phone jack 36 and a digital subscriber line ("DSL") jack 38 for high speed Internet access. The secondary phone jack 36 and the DSL jack 38 may be either an RJ-11 style jack or an RJ-14 style jack, as previously described. The secondary phone jack 36 is disposed on the inner surface 21 of the base 20 and is received within a relief 50 formed in the sidewall 49 of the cover 40. The DSL jack 38 is likewise disposed on the inner surface 21 of the base 20 and is received within a relief 52 (FIG. 5) formed in the sidewall 49 of the cover 40 opposite the relief 50.

The end of the line cord 28 opposite the phone plug 29 comprises at least one wire pair, and typically, comprises a first pair of tip and ring wires for a first telephone line and a second pair of tip and ring wires for a second telephone line. The wire pair(s) of the line cord 28 may be wired to the wire terminating devices 26 and the filter circuit 24 in any suitable manner depending on the desired configuration of the housing 10. For purposes of example only, and not by way of limitation, the subscriber may desire xDSL service on the first telephone line and POTS service on the second telephone line. In this instance, the housing 10 may be configured with two telephone lines, with only the first telephone line passing through the filter circuit 24. Thus, the tip and ring wires for the first telephone line and the second telephone line are electrically connected from the phone plug 29 to the line cord 28 and in turn to the wire terminating devices 26. The tip and ring wires for the first telephone line are then electrically connected from the wire terminating devices 26 to the input wire terminations of the filter circuit 24. The output wire terminations of the filter circuit 24 are then electrically connected to both the phone jack 32 and the secondary phone jack 36. The tip and ring wires for the first telephone line are also electrically connected from the wire terminating devices 26 directly to the DSL jack 38. Finally, the tip and ring wires for the second telephone line are electrically connected from the wire terminating devices 26 to the phone jack 32, the secondary phone jack 36 and the DSL jack 38. Accordingly, an unfiltered xDSL (i.e., voice and data) signal is delivered to DSL jack 38 while the filter circuit 24 delivers a filtered voice signal from the first telephone line to only the phone jack 32 and the secondary phone jack 36. Additionally, an unfiltered POTS signal is delivered to the phone jack 32, the secondary phone jack 36, and the DSL jack 38 on the second telephone line. The preceding example is only one of the many different possible configurations and wiring schemes that the housing 10 may have, and thus, should not be construed as limiting the invention in any manner. For example, another possible configuration may have a second filter circuit for filtering the second telephone line in the same or a different manner.

The cover 40 comprises a pair of mounting studs 43 positioned over the holes 42 and retained between the outer surface 45 of the cover 40 and the fasteners 60. The mounting studs 43 engage elongated slots on the rear surface of the telephone 16 to removably attach the telephone 16 to the housing 10 in the same manner as the housing 10 is attached to the wall plate 12. In addition to the pair of holes 42 and the first opening 44 described above, the cover 40 of the housing 10 has a second opening 46 formed therethrough adjacent the lower edge of the cover 40. Together, the first opening 44 and the second opening 46 define an upper viewing window and a lower viewing window opposite a pair of upper and lower slots 35 formed through the base 20 for receiving the mounting studs 11 of the wall plate 12. The upper viewing window 44 and the lower viewing window 46 permit an installer, preferably the subscriber, to readily align the upper and lower slots 35 in the base 20 over the mounting studs 11 of the wall plate 12. Accordingly, it is unlikely that the housing 10 will be improperly seated on the wall plate 12. If not properly seated, the housing 10 could unexpectedly detach from the wall plate 12 while the telephone 16 is positioned on the housing 10, resulting in possible damage to the telephone 16.

Preferably, yet another feature is provided to secure the housing 10 to the wall plate 12. As shown, the housing 10 further comprises a locking mechanism 70 partially disposed within cavity 30 between the base 20 and the cover 40. In the embodiment illustrated in FIGS. 1–7, the locking mechanism 70 comprises an elongate slide lock 72 having a grip portion 71 adjacent one end and a narrower stop portion 73 adjacent the other end. The slide lock 72 has a recess 74 formed in the upper surface thereof for a purpose to be described. The grip portion 71 protrudes through a relief 37 (FIG. 2) formed in the lip 39 of the base 20 and a corresponding relief 47 formed in the sidewall 49 of the cover 40. The locking mechanism 70 further comprises a pair of opposed guide ribs 76 (FIG. 2) extending upwardly from the inner surface 21 of the base 20. The stop portion 73 of the slide lock 72 is disposed between the guide ribs 76 so that the guide ribs 76 serve to guide the stop portion 73 therebetween. The locking mechanism 70 further comprises a retaining rib 78 (FIG. 5) extending downwardly from the inner surface 41 of the cover 40. The retaining rib 78 is disposed between the guide ribs 76 over the recess 74 formed in the slide lock 72. The retaining rib 78 thereby serves to retain the slide lock 72 within the cavity 30 and the stop portion 73 between the guide ribs 76 when the cover 40 is secured on the base 20.

Figure 6:
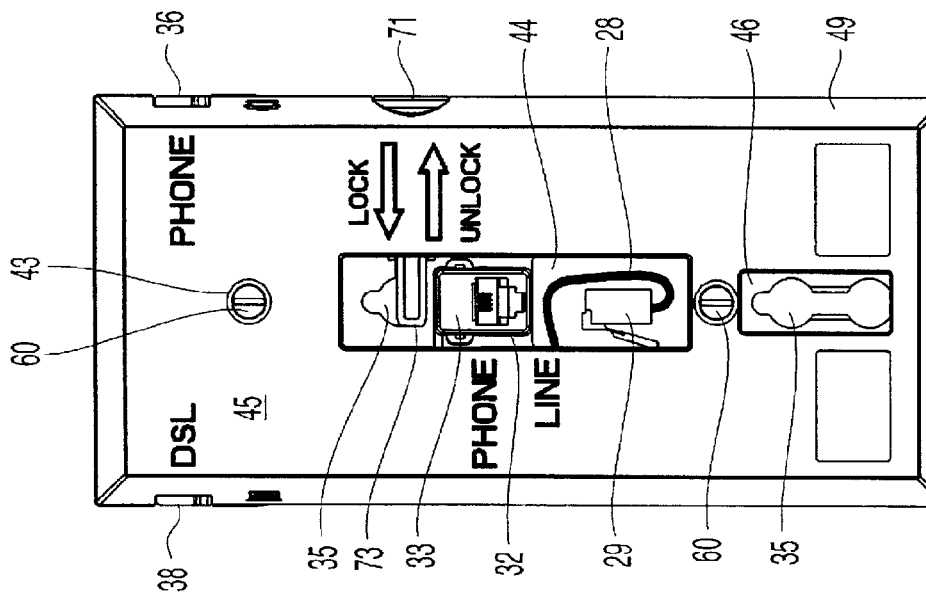
FIG. 6 is a plan view showing the front of the housing of FIG. 1 with the slide lock in the unlocked position.
Figure 7:
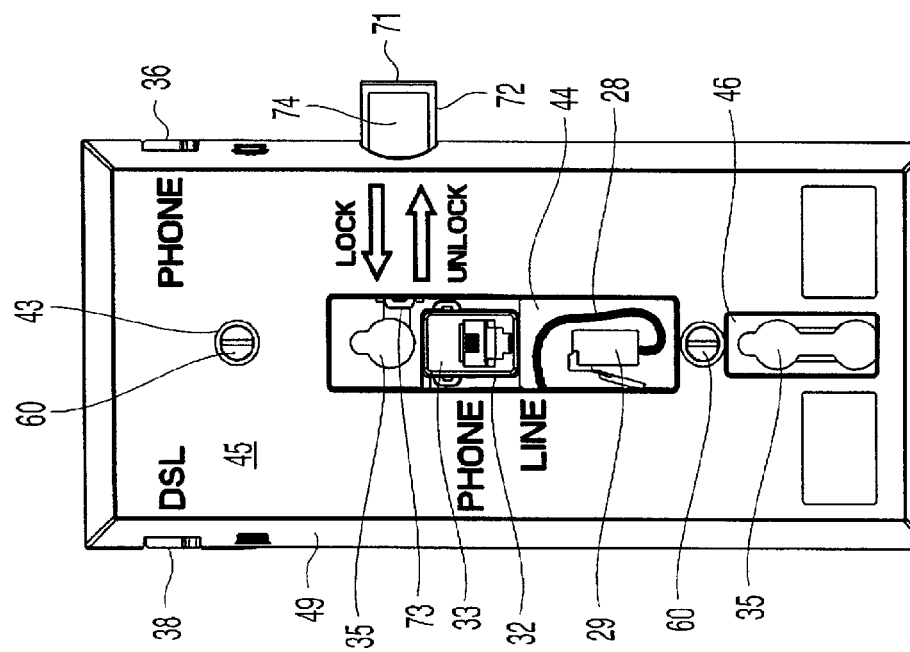
FIG. 7 is a plan view showing the front of the housing of FIG. 1 with the slide lock in the locked position.

The slide lock 72 is shown in the unlocked position in FIG. 6. In the unlocked position, the grip portion 71 of the slide lock 72 extends substantially outward from the housing 10 and the stop portion 73 does not extend substantially beneath the upper viewing window 44 of the cover 40. The slide lock 72 is shown in the locked position in FIG. 7. In the locked position, the grip portion 71 of the slide lock 72 is positioned within the relief 37 and the relief 47 substantially flush with the housing 10 and the stop portion 73 extends substantially inward beneath the upper viewing window 44 of the cover 40. Accordingly, in the unlocked position the stop portion 73 of the slide lock 72 does not obstruct the upper slot 35 formed in the base 20 so that the housing 10 may be readily positioned over the mounting studs 11 on the wall plate 12. In the locked position, however, the stop portion 73 obstructs the upper slot 35 so that the housing 10 cannot be removed from the wall plate 12 without first moving the slide lock 72 from the locked position to the unlocked position. The locking mechanism 70 may be located adjacent the lower viewing window 46 and utilized in conjunction with the lower slot 35. Alternatively, a locking mechanism 70 may be located adjacent each of the viewing windows 44, 46 and utilized in conjunction with both the upper and lower slots 35.

In operation, an installer or the subscriber removes the telephone 16 from the wall plate 12 by sliding the telephone 16 upwardly until the elongated slots on the rear of the telephone 16 disengage from the mounting studs 11 on the wall plate 12. The phone plug on the rear of the telephone 16 is then removed from the phone jack 13 on the wall plate 12 and the telephone 16 is set aside. The fully assembled housing 10 is next positioned over the wall plate 12 with the cover 40 secured to the base 20 and the slide lock 72 in the unlocked position. While observing the mounting studs 11 through the upper viewing window 44 and the lower viewing window 46, the slots 35 on the base 20 of the housing 10 are aligned with the mounting studs 11. The housing 10 is then slid downwardly until the slots 35 engage the mounting studs 11 on the wall plate 12. The slide lock 72 is then moved to the locked position to secure the housing 10 on the wall plate 12. The phone plug 29 on the line cord 28 of the housing 10 is then inserted into the phone jack 13. The phone plug 29 may, however, be inserted prior to the housing 10 being installed onto the mounting studs of the wall plate 12. In the configuration shown and described herein, a secondary phone plug (not shown) is inserted into the secondary phone jack 36, a data plug (not shown) is inserted into the DSL jack 38 and the phone plug on the rear of the telephone 16 is inserted into the phone jack 32. The elongated slots on the rear of the telephone 16 are then aligned with the mounting studs 43 on the cover 40 of the housing 10 and the telephone 16 is slid downwardly until the elongated slots engage the mounting studs 43. Removal of the housing 10 is typically accomplished by reversing the order of the installation steps.

Figure 9:
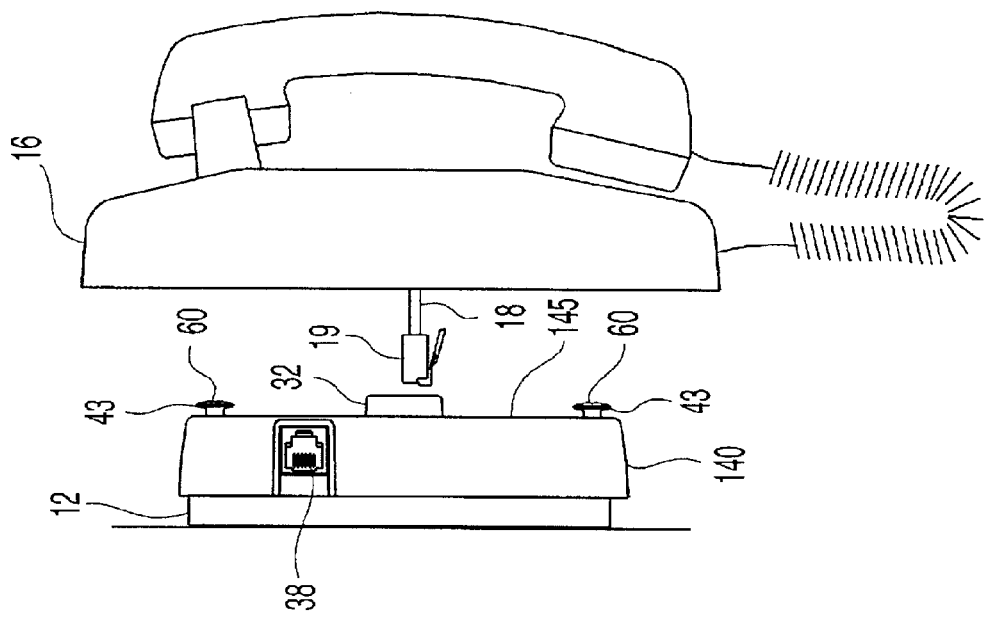
FIG. 9 is an exploded side view illustrating a wall-mount telephone removably mounted to the housing of FIG. 8 in a conventional manner.
Figure 8:
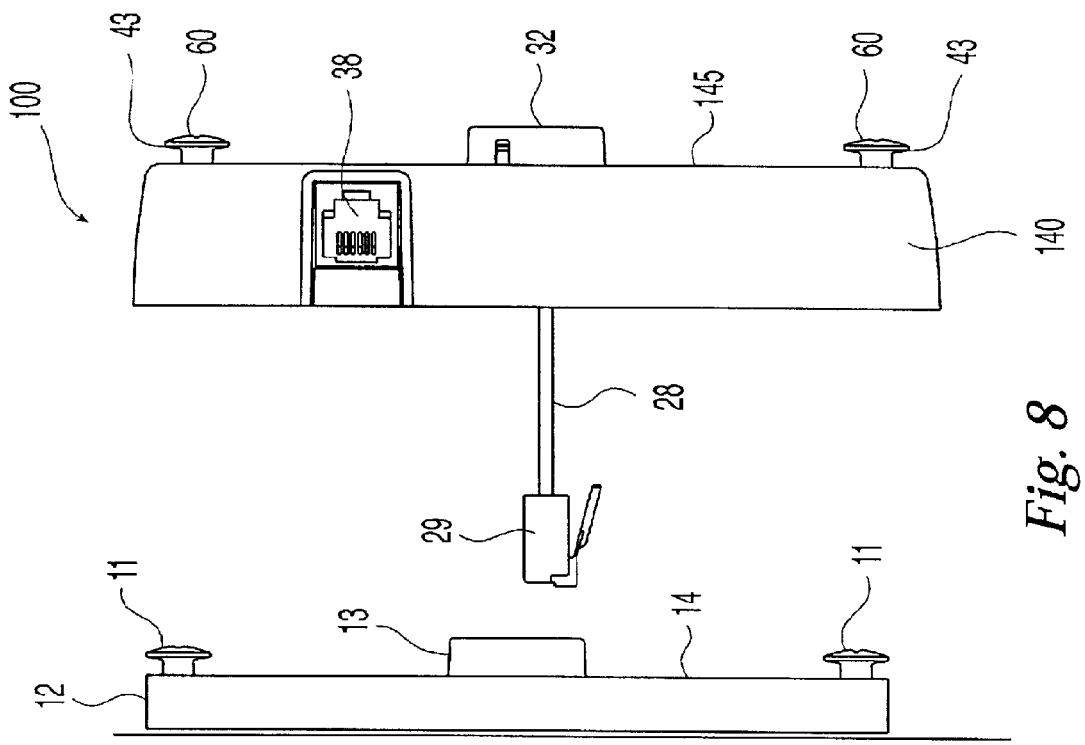
FIG. 8 is an exploded side view illustrating an alternative embodiment of a housing according to the invention removably mounted to a wall plate.
Figure 11:
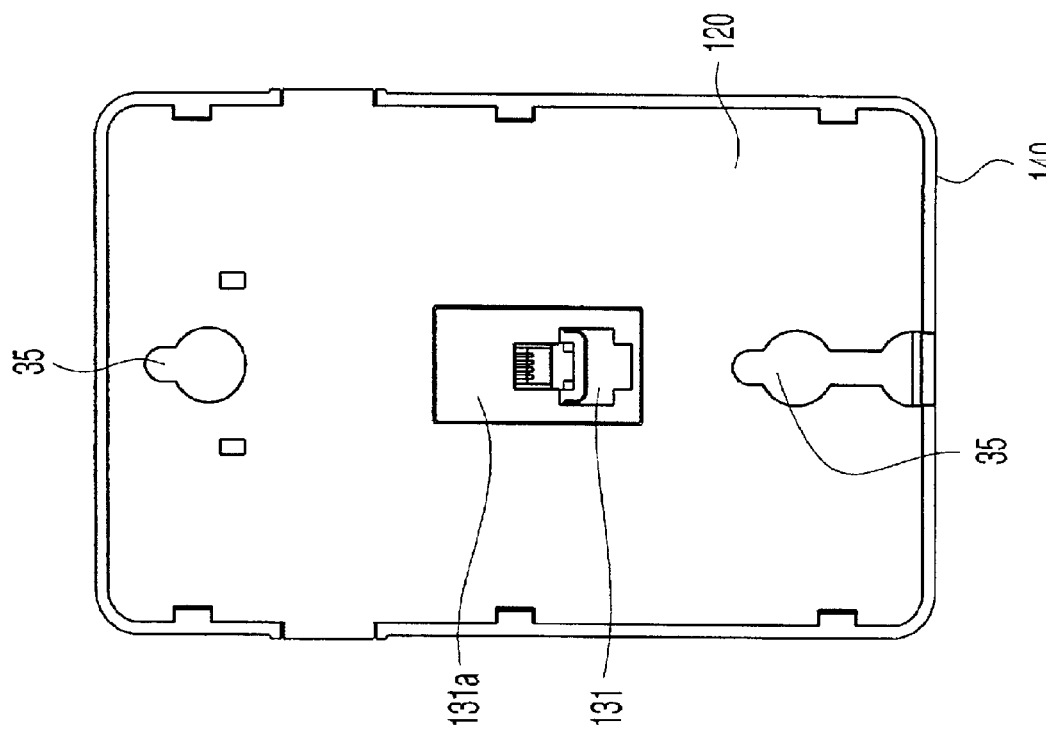
FIG. 11 is a plan view showing the rear of the housing of FIG. 8.
Figure 10:
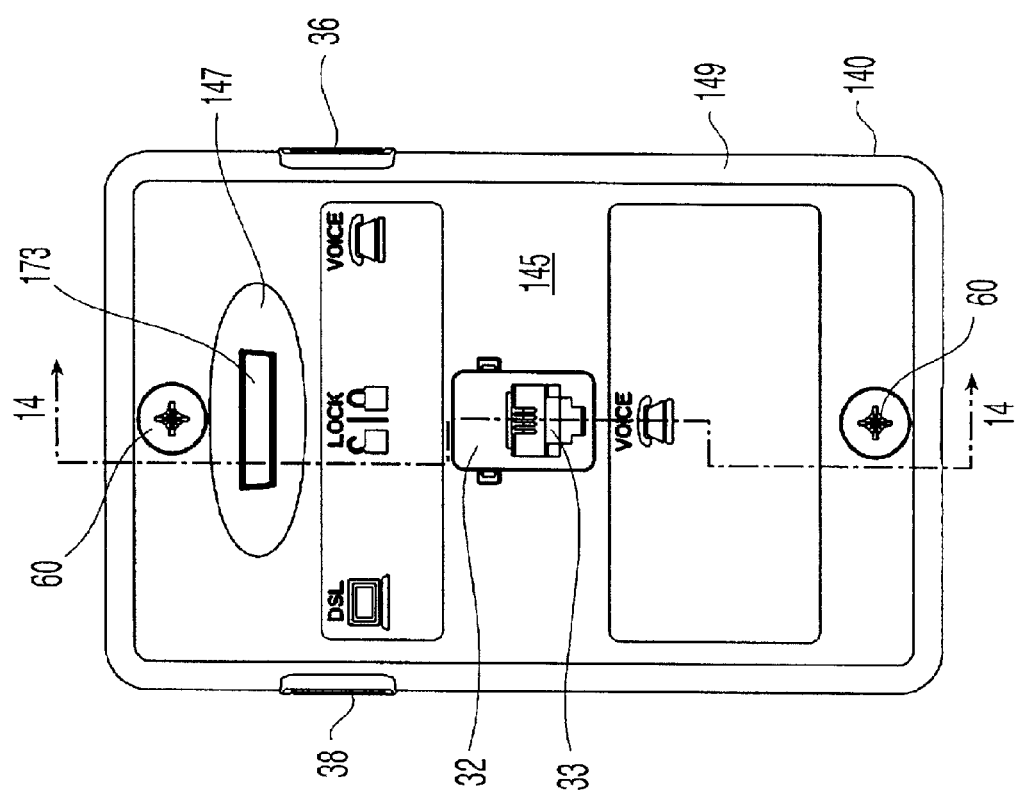
FIG. 10 is a plan view showing the front of the housing of FIG. 8.

An alternative embodiment of a housing 100 for a distributed filter constructed in accordance with the invention is shown in FIGS. 8–14. The housing 100 functions in the same manner as the housing 10 and is similar in structure and construction except that the upper and lower viewing windows 44, 46 are removed and the locking mechanism 170 is relocated to the outer surface 145 of the cover 140. As a result, the housing 100 is substantially more compact than the housing 10, and thus, may be entirely hidden from view when a conventional wall-mount telephone 16 is attached to the housing 100. FIG. 8 illustrates the manner in which the housing 100 is removably mounted to a wall plate 12 having a pair of mounting studs 11 and a phone jack 13 of the type previously described. The phone plug 29 of the line cord 28 of the housing 100 is received within the phone jack 13 protruding outwardly from the front surface 14 of the wall plate 12. The phone jack 13, however, may also be recessed or flush-mounted with the front surface 14 of the wall plate 12, as previously described. The slots 35 (FIGS. 11 and 12)

formed through the base 120 of the housing 100 engage the mounting studs 11 of the wall plate 12 to attach the housing 100 to the wall plate 12, as previously described. FIG. 9 illustrates the manner in which the telephone 16 is removably mounted to the housing 100. The phone plug 19 of the line cord 18 of the telephone 16 is received within the phone jack 32 protruding outwardly from the outer surface 145 of the cover 140. The slots (not shown) formed in the rear surface of the telephone 16 engage the mounting studs 43 of the cover 140 to attach the telephone 16 to the housing 100, as previously described.

The housing 100 is shown in greater detail in FIGS. 10–14. As shown and described herein, the housing 100 comprises a base 120 and a cover 140 attached to the base 120 such that the base 120 and the cover 140 define an internal cavity 130 (FIG. 14) therebetween. As previously mentioned, the base 120 and the cover 140 are substantially the same in function, structure and construction as the base 20 and the cover 40 previously described and the cover 140 is secured to the base 120 in substantially the same manner. Accordingly, only the differences between the housing 100 and the housing 10 will be described hereinafter.

The housing 100 further comprises a filter circuit 124 (FIG. 12) mounted on the inner surface 121 of the base 120 such that the filter circuit 124 is electrically insulated and physically protected within the cavity 130 of the housing 100. The filter circuit 124 may be any electronic circuit for separating voice and data signals. Preferably, the filter circuit 124 is a low pass (i.e., distributed) filter for passing only the voice signal of an asymmetrical digital subscriber line ("ADSL"). The filter circuit 124 is mounted on a printed circuit board 123 having at least a pair of input wire terminations 126a and at least a pair of output wire terminations 126b disposed thereon that are electrically connected to the filter circuit 124. Preferably, the input and output wire terminations 126a, 126b are solder points disposed on the printed circuit board 123. The printed circuit board 123 is positioned on the inner surface 121 of the base 120 between a plurality of support posts 125 for a purpose to be described. The line cord is routed through an S-shaped strain relief guide 127 affixed to the inner surface 121 of the base 120. A generally U-shaped retaining rib 148 (FIG. 13) extends downwardly from the inner surface 141 of the cover 140 to retain the line cord 28 within the strain relief guide 127 when the cover 140 is secured on the base 120. A portion of the line cord 28 and the phone plug 29 extend through an opening 131 formed through the base 120 to engage the phone jack 13 of the wall plate 12. The line cord 28 and phone plug 29 may be replaced by an inextensible phone plug that protrudes outwardly from the base 120. However, the use of the extensible line cord 28 and phone plug 29 permits the housing 100 to be utilized with both a wall plate 12 having a protruding phone jack 13 (as shown) and a wall plate having a recessed or flush-mounted phone jack. The opening 131 is formed in a recess 131a (FIG. 11) to allow the phone plug 29 and the line cord 28 to extend from the cavity 130. Recess 131a is sized appropriately to allow clearance for the phone jack 13 and the phone plug 29 within the recess 131a when the housing 100 is fully installed onto the wall plate 12. The excess length of the line cord 28 is naturally retracted into the cavity 130 defined by the base 120 and the cover 140 as a result of the elasticity of the line cord, the clearance provided within the cavity 130 and the retention force exerted by the strain relief guide 127. In FIG. 12, the dashed line representation indicates the position of the line cord 28 when extended to make connection to the phone jack 13 on the wall plate 12 and the solid line representation indicates the position of the line cord 28 when retracted into the cavity 130 when the housing 100 is fully installed onto the wall plate 12.

As previously described, phone jack 13 may be an RJ-11 or RJ-14 style jack depending on whether the housing 100 is configured to service a single telephone line or two telephone lines, respectively, and the phone plug 29 is a six position plug that is wired as necessary to complement the phone jack 13. The housing 100 further comprises a phone jack 32, a secondary phone jack 36 and a DSL jack 38, as previously described. The phone jack 32 is mounted to and protrudes outwardly from the cover 140 of the housing 100. The secondary phone jack 36 is disposed on the printed circuit board 123 of the base 120 and is received within a relief 50 formed in the sidewall 149 of the cover 140 (FIG. 13). The DSL jack 38 is likewise disposed on the printed circuit board 123 of the base 120 and is received within a relief 52 (FIG. 13) formed in the sidewall 149 of the cover 140 opposite the relief 50. Preferably, the secondary phone jack 36 and the DSL jack 38 are mounted directly on the printed circuit board 123 to minimize the space occupied by the filter circuit 124, the secondary phone jack 36 and the DSL jack 38 within the cavity 130 defined by the base 120 and the cover 140. In addition, mounting the secondary phone jack 36 and the DSL jack 38 on the circuit board 123 with the filter circuit 124 eliminates the wiring terminations to and from the secondary phone jack 36 and the DSL jack 38, thereby further reducing the space requirements. For purposes of example only, and not by way of limitation, the subscriber may desire xDSL service on both the first telephone line and the second telephone line. In this instance, the housing 100 may be configured with two telephone lines and the filter circuit 124 may comprise a first filter circuit 124a for the first telephone line and a second filter circuit 124b for the second telephone line. As shown herein, the end of the line cord 28 opposite the phone plug 29 comprises a first pair of tip and ring wires for a first telephone line and a second pair of tip and ring wires for a second telephone line. The wire pairs of the line cord 28 are wired to the input wire terminations 126a on the printed circuit board 123 such that the first telephone line is electrically connected to both the first line of the DSL jack 38 and the first filter circuit 124a, while the second telephone line is electrically connected to both the second line of the DSL jack 38 and the input of the second filter circuit 124b. The output of the first filter circuit 124a and the output of the second filter circuit 124b are electrically connected on the printed circuit board 123 to both the secondary phone jack 36 and the output wire terminations 126b. The output wire terminations 126b are in turn electrically connected to the phone jack 32. Thus, from the phone plug 29, the first telephone line and the second telephone line are electrically connected and deliver unfiltered xDSL (voice and data) signals to the DSL jack 38 and filtered POTS signals to the phone jack 32 and the secondary phone jack 36. The preceding example is only one of the many different possible configurations and wiring schemes that the housing 100 may have, and thus, should not be construed as limiting the invention in any manner. For example, another possible configuration may have only a first filter circuit for filtering only the first telephone line in the same or a different manner.

The housing 100 further comprises a locking mechanism 170 (FIG. 14) partially disposed within cavity 130 between the base 120 and the cover 140. In the embodiment illustrated in FIGS. 8–14, the locking mechanism 170 comprises a generally rectilinear push-button lock 172 having a stop portion 171 adjacent one end and an actuator portion 173 adjacent the other end. The actuator portion 173 protrudes through an opening 147 formed in the cover 140 and is supported by a pair of guide ribs 174 (FIG. 13) extending downwardly from the inner surface 141 of the cover 140. The locking mechanism 170 further comprises a pair of opposed retaining clips 176 (FIG. 12) extending upwardly from the inner surface 121 of the base 120. The stop portion 171 of the slide lock 172 comprises a pair of opposed retaining posts 178 (FIG. 13) that engage the retaining clips 176 to secure the push-button lock 172 to the base 120, as will be described. The locking mechanism 170 may be located adjacent and utilized in conjunction with the lower slot 35. Alternatively, a locking mechanism 170 may be located adjacent each and utilized in conjunction with both the upper and lower slots 35.

Figure 14:
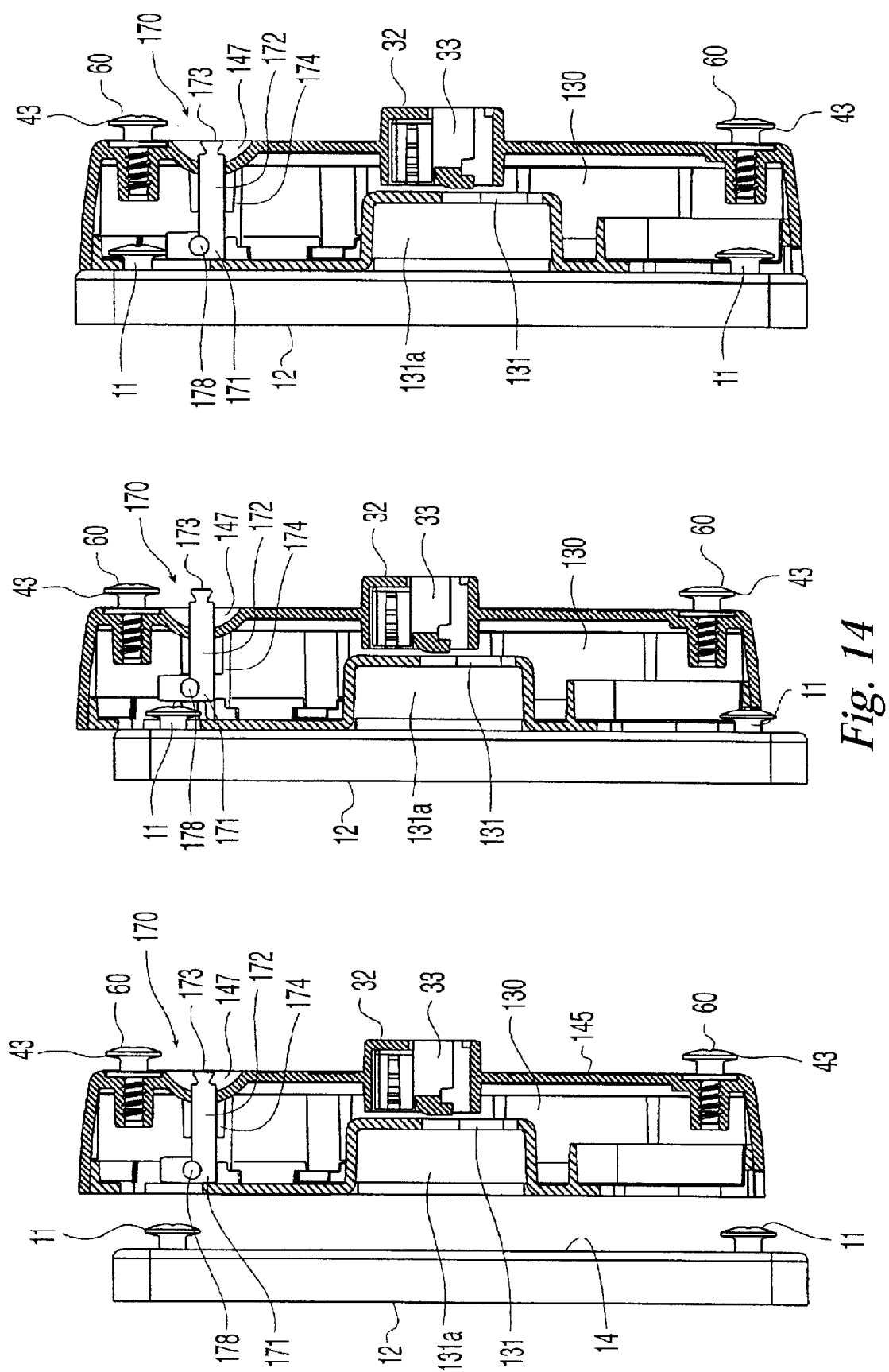
FIG. 14 is a series of exploded side views illustrating the sequence in which the housing of FIG. 8 is secured to the wall plate.

FIG. 14 illustrates the sequence in which the housing 100 is secured to the wall plate 12 utilizing the push-button lock 172. As manufactured and assembled (left-hand view), the retaining posts 178 of the stop portion 171 of the push-button lock 172 are secured to the retaining clips 176 on the base 120. Accordingly, the actuating portion 173 of the push-button lock 172 is substantially flush with the outer surface 145 of the cover 140. During installation, the upper mounting stud 11 of the wall plate 12 is received in the upper slot 35 of the base 120 and the retaining posts 178 are forced out of engagement with the retaining clips 176. As a result, the actuating portion 173 protrudes outwardly from the outer surface 145 of the cover 140 to the unlocked position. Once the housing 100 is slid downwardly over the mounting studs 11 of the wall plate 12, the stop portion 171 of the push-button lock 172 is no longer obstructed by the upper mounting stud 11. Thereafter, the actuating portion 173 can be depressed so that the retaining posts 178 are once again secured in the retaining clips 176 on the base 120 of the housing 100. In the locked position (right-hand view), the housing 100 cannot be slid upwardly relative to the wall plate 12 without first moving the actuating portion 173 from the locked position to the unlocked position. Accordingly, the housing 100 is securely attached to the wall plate 12, yet is easily removable (i.e., by pulling out the actuator portion 173) without the use of a tool of any kind.

In operation, an installer or the subscriber removes the telephone 16 from the wall plate 12 by sliding the telephone 16 upwardly until the elongated slots on the rear of the telephone 16 disengage from the mounting studs 11 on the wall plate 12. The phone plug on the rear of the telephone 16 is then removed from the phone jack 13 on the wall plate 12 and the telephone 16 is set aside. The phone plug 29 on the line cord 28 of the housing 100 is then inserted into the phone jack 13. The fully assembled housing 100 is next positioned over the wall plate 12 with the cover 140 secured to the base 120 and the actuating portion 173 of the push-button lock 172 depressed. The slots 35 on the base 120 of the housing 100 are aligned with the mounting studs 11 and the housing 100 is positioned on the wall plate 12. As the upper slot 35 engages the upper mounting stud 11, the push-button lock 172 is forced outwardly to the unlocked position. The housing 100 is then slid downwardly until the slots 35 engage the mounting studs 11. Once the mounting studs 11 are properly seated in the slots 35, the actuating portion 173 of the push-button lock 172 is depressed again to secure the housing 100 on the wall plate 12. In the configuration shown and described herein, a secondary phone plug (not shown) is inserted into the secondary phone jack 36, a data plug (not shown) is inserted into the DSL jack 38 and the phone plug 19 on the rear of the telephone 16 is inserted into the phone jack 32. The elongated slots on the rear of the telephone 16 are then aligned with the mounting studs 43 on the cover 140 of the housing 100 and the telephone 16 is slid downwardly until the elongated slots engage the mounting studs 43. Removal of the housing 100 is typically accomplished by reversing the order of the installation steps, with the exception that the actuating portion 173 must be pulled outwardly to disengage the push-button lock 172 before the housing 100 is slid upwardly to disengage the slots 35 from the mounting studs 11 on the wall plate 12.

It is to be understood that the foregoing description is exemplary only and, as such, is intended to provide further explanation of the invention without limiting the scope of the invention in any manner. Obviously, many alternative embodiments and configurations of the invention are within the ordinary skill of one knowledgeable in the art. It will be readily apparent to those skilled in the art that the invention is not limited to the specific embodiments shown and described herein, but is susceptible to various changes without departing from the scope of invention. Thus, it is intended that the appended claims encompass any and all alternative embodiments of the invention not disclosed herein that are within the ordinary skill of a person knowledgeable in the art.

That which is claimed is:

1. A housing for mounting to a wall plate having at least one mounting stud protruding outwardly therefrom, the housing comprising:

a base having a slot formed therein for receiving the mounting stud of the wall plate to removably mount the housing to the wall plate;

a cover overlying to base and attached thereto, the cover and the base defining a cavity therebetween, the cover having at least one viewing window for viewing the mounting stud of the wall plate;

a phone jack disposed within the cavity and accessible through the cover, and a locking mechanism for securing the housing to the wall plate, the locking mechanism slidingly movable between an unlocked position and a locked position without the use of a tool and comprising a stop portion, the stop portion obstructing the slot in the locked position to prevent the housing from being removed from the wall plate.

2. A housing according to claim 1 wherein the at least one mounting stud of the wall plate comprises an upper mounting stud and lower mounting stud and wherein the at least one viewing window of the cover comprises an upper window for viewing the upper mounting stud of the wall plate and a lower window for viewing the lower mounting stud of the wall plate.

3. A housing according to claim 1 wherein the at least one mounting stud of the wall plate comprises an upper mounting stud and a lower mounting stud and wherein the slot of the base comprises an upper slot and a lower slot for receiving the upper mounting stud and the lower mounting stud, respectively, of the wall plate.

4. A housing according to claim 1 wherein the cover comprises at least one mounting stud protruding outwardly therefrom for removably mounting a wall-mount telephone to the housing.

5. A housing according to claim 4 wherein the at least one mounting stud of the cover comprises an upper mounting stud and a lower mounting stud and the wall-mount telephone has an upper slot and a lower slot for receiving the upper mounting stud and the lower mounting stud, respectively, of the cover to removably mount the wall-mount telephone to the housing.

6. A housing according to claim 1 further comprising a line cord having a phone plug attached at one end and wherein a portion of the line cord and the phone plug extend outwardly through an opening formed in the base of the housing.

7. A housing according to claim 6 further comprising at least one auxiliary jack disposed within the cavity and accessible through the cover.

8. A housing according to claim 7 wherein the at least one auxiliary jack comprises a secondary phone jack and a digital subscriber line ("DSL") jack.

9. A housing according to claim 8 further comprising a filter circuit disposed within the cavity and electrically connected in series between the line cord and at least one of the phone jack, the secondary phone jack and the DSL jack for delivering a filtered voice signal to the at least one of the phone jack, the secondary phone jack and the DSL jack.

10. A housing according to claim 6 wherein the phone plug is electrically connected to a phone jack on the wall plate and the phone jack of the housing is electrically connected to a wall-mount telephone.

11. A housing according to claim 1 further comprising a plurality of wire terminating devices disposed on the base and selected from the group consisting of screw terminals, insulation displacement contacts (IDCs") and solder points.

12. A housing for mounting to a wall plate having at least one mounting stud protruding outwardly therefrom, the housing comprising:
   a base having a slot formed therein for receiving the mounting stud of the wall plate to removably mount the housing to the wall plate;
   a cover overlying the base and attached thereto, the cover having at least one viewing window for viewing the mounting stud of the wall plate while the housing is attached to the wall plate; and
   a locking mechanism for securing the housing to the wall plate, the looking mechanism slidingly movable between an unlocked position and a locked position without the use of a tool and comprising a stop portion, the stop portion obstructing the slot in the locked position to prevent the housing from being removed from the wall plate.

13. A housing for mounting to a wall plate having at least one mounting stud protruding outwardly therefrom, the housing comprising:
   a base having a slot formed therein for receiving the mounting stud of the wall plate to removably attach the base to the wall plate;
   a cover overlying the base and attached thereto, the cover having at least one viewing window for viewing the mounting stud of the wall plate; and
   means for locking the bowing to the wall plate, the locking means slidingly movable between an unlocked position and a locked position wherein the slot is obstructed to prevent the housing from being removed from the wall plate.

14. A housing according to claim 13 wherein the base and the cover define a cavity therebetween and wherein the locking means is disposed substantially within the cavity.

15. A housing according to claim 13 wherein the locking means comprises a slide lock having a grip portion adjacent one end and a stop portion adjacent the other end, the stop portion not obstructing the slot of the base in the unlocked position and obstructing the slot of the base in the locked position.

16. A housing according to claim 15 wherein the grip portion extends outwardly from the housing in the unlocked position and is substantially flush with the housing in the locked position.

17. A housing according to claim 16 wherein the slide lock has a recess formed therein and wherein the locking means further comprises a pair of opposed guide ribs extending inwardly from one of the base and the cover for guiding the stop portion and a retaining rib extending inwardly from the other of the base and the cover into the recess to retain the stop portion between the guide ribs.

18. A housing according to claim 13 wherein the locking means comprises a push-button lock having an actuating portion adjacent one end and a stop portion adjacent the other end, the stop portion not obstructing the slot of the base in the unlocked position and obstructing the slot of the base in the locked position.

19. A housing according to claim 18 wherein the actuating portion extends outwardly from the housing in the unlocked position and is substantially flush with the housing in the locked position.

20. A housing according to claim 19 wherein the locking means further comprises a pair of opposed retaining clips extending inwardly from the base and the stop portion has a pair of opposed retaining posts for engaging the retaining clips to retain the stop portion in the locked position.

21. A housing for mounting to a wall plate having at least one mounting stud protruding outwardly therefrom, the housing comprising:
   a base having a slot formed therein for receiving the mounting stud of the wall plate to removably attach the base to the wall plate;
   a cover overlying the base and attached thereto, the base and the cover defining a cavity therebetween, the cover having at least one viewing window for viewing the mounting stud of the wall plate; and
   a slide lock slidingly disposed substantially within the cavity and having a grip portion adjacent one end and a stop portion adjacent the other end, the stop portion not obstructing the slot of the base in an unlocked position and obstructing the slot of the base in a locked position.

22. A housing according to claim 21 wherein the grip portion extends outwardly from the bowing in the unlocked position and is substantially flush with the housing in the locked position.

23. A housing according to claim 21 wherein the slide lock has a recess formed therein and the housing further comprises a pair of opposed guide ribs extending inwardly from one of the base and the cover for guiding the stop portion and a retaining rib extending inwardly from the other of the base and the cover into the recess to retain the stop portion between the guide ribs.

* * * * *